(12) United States Patent
Wang

(10) Patent No.: US 10,949,001 B2
(45) Date of Patent: Mar. 16, 2021

(54) SYSTEM AND METHOD OF UTILIZING A STYLUS WITH AN INFORMATION HANDLING SYSTEM

(71) Applicant: Dell Products L.P., Round Rock, TX (US)

(72) Inventor: Kai Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/512,623

(22) Filed: Jul. 16, 2019

(65) Prior Publication Data

US 2021/0018994 A1 Jan. 21, 2021

(51) Int. Cl.
| | |
|---|---|
| *G06F 3/0354* | (2013.01) |
| *G06F 3/03* | (2006.01) |
| *G06F 3/038* | (2013.01) |
| *G06F 3/02* | (2006.01) |
| *G06F 3/0484* | (2013.01) |

(52) U.S. Cl.
CPC ........ *G06F 3/03545* (2013.01); *G06F 3/0202* (2013.01); *G06F 3/038* (2013.01); *G06F 3/0312* (2013.01); *G06F 3/04842* (2013.01); *G06F 3/04847* (2013.01); *G06F 2203/0384* (2013.01)

(58) Field of Classification Search
None
See application file for complete search history.

(56) References Cited

U.S. PATENT DOCUMENTS

2016/0349862 A1* 12/2016 Harris ................. G06F 3/03545
2018/0095555 A1* 4/2018 Gemerman ......... G06F 3/04845

OTHER PUBLICATIONS

Mike Grusin and Ho Yun Bobby Chan, RGB_Rotary_Encoder; Jan. 3, 2019; 6 pages.
Top-Up Industry Corp., EC12PLRGBSDEF-D-25.3K-24-24C-61/08-6H (H), Aug. 3, 2018; 1 pages.
Top-Up Industry Corp., Rotational Encoder Specification, Oct. 11, 2010; 10 pages.
Mechatronic Solutions LLC, Arduino Sensors & Components, Savy Microcontroller Solutions, retrieved from: http://www.savvysolutions.info/savvymicrocontrollersolutions/arduino.php?topic=Sparkfun-RGB-pushbutton-rotary-encoder-COM-10982, 2014; 11 pages.
Sparkfun Electronics, Rotary Encoder—Illuminated (RGB)—COM-15141, retrieved from: https://www.sparkfun.com/products/15141, 2019; 6 pages.

(Continued)

*Primary Examiner* — Nicholas J Lee
(74) *Attorney, Agent, or Firm* — Baker Botts L.L.P.

(57) ABSTRACT

In one or more embodiments, one or more systems, methods, and/or processes may receive, via a touch screen, first user input from a stylus that selects an element of a graphical user interface (GUI); may receive, via a rotary encoder of the stylus, second user input that is associated with a first possible selection associated with the element of the GUI; may provide first light emissions of a first color; may receive, via the rotary encoder of the stylus, third user input that is associated with a second possible selection associated with the element of the GUI; may provide second light emissions of a second color, different from the first color; may receive fourth user input via an electromechanical switch of the stylus; and may select the second possible selection associated with the element of the GUI.

17 Claims, 13 Drawing Sheets

(56) References Cited

OTHER PUBLICATIONS

GitHub—nvladimus/ArduinoRotaryEncoderPCB: A small PCB for denoising a rotary encoder with LED illuminated shaft, retrieved from: https://github.com/nyladimus/ArduinoRotaryEncoderPCB, 2019; 3 pages.

* cited by examiner

SYSTEM AND METHOD OF UTILIZING A STYLUS WITH AN INFORMATION HANDLING SYSTEM

BACKGROUND

Field of the Disclosure

This disclosure relates generally to information handling systems and more particularly to utilizing a stylus with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive, via a touch screen, first user input from a stylus that selects an element of a graphical user interface (GUI); may receive, via a rotary encoder of the stylus, second user input that is associated with a first possible selection associated with the element of the GUI; in response to receiving, via the rotary encoder of the stylus, the second user input that is associated with the first possible selection associated with the element of the GUI, may provide first light emissions of a first color; may receive, via the rotary encoder of the stylus, third user input that is associated with a second possible selection associated with the element of the GUI; in response to receiving, via the rotary encoder of the stylus, the third user input that is associated with the second possible selection associated with the element of the GUI, may provide second light emissions of a second color, different from the first color; may receive fourth user input via an electromechanical switch of the stylus; and in response to receiving the fourth user input via the electromechanical switch of the stylus, may select the second possible selection associated with the element of the GUI.

In one or more embodiments, the one or more systems, methods, and/or processes, in response to receiving, via the rotary encoder of a stylus, the second user input that is associated with the first possible selection associated with the element of the GUI, may further provide first information that indicates a first partial rotation of the rotary encoder to an information handling system in a wireless fashion; in response to receiving, via the rotary encoder of the stylus, the third user input that is associated with the second possible selection associated with the element of the GUI, may further provide second information that indicates a second partial rotation of the rotary encoder to the information handling system in the wireless fashion; and in response to receiving the fourth user input via the electromechanical switch of the stylus, may further provide third information that indicates an actuation of the electromechanical switch to the information handling system in the wireless fashion.

In one or more embodiments, the one or more systems, methods, and/or processes may further receive the first information; in response to receiving the first information, may further adjust the element of the GUI to display the first possible selection associated with the element of the GUI; may further receive the second information; and in response to receiving the second information, may further adjust the element of the GUI to display the second possible selection associated with the element of the GUI.

In one or more embodiments, the first color may indicate a first possible drawing color of the GUI. In one or more embodiments, the second color may indicate a second possible drawing color of the GUI. In one or more embodiments, the first color may indicate a first possible drawing width of the GUI. In one or more embodiments, the second color may indicate a second possible drawing width of the GUI. In one or more embodiments, the first color may indicate a first possible power setting of an information handling system. In one or more embodiments, the second color may indicate a second possible power setting of the information handling system. In one or more embodiments, the first color may indicate a first possible output volume setting of a speaker. In one or more embodiments, the second color may indicate a second possible output volume setting of the speaker.

In one or more embodiments, providing the first light emissions of the first color may include multiple light emitting diodes (LEDs) of the stylus providing the first light emissions of the first color. In one or more embodiments, providing the second light emissions of the second color may include the multiple LEDs of the stylus providing the second light emissions of the second color. In one or more embodiments, the multiple LEDs include at least two of a red light emitting diode (LED), a green LED, and a blue LED.

In one or more embodiments, the one or more systems, methods, and/or processes, after selecting the second possible selection associated with the element of the GUI, may further determine that the stylus is in contact with a display. In one or more embodiments, the one or more systems, methods, and/or processes, after selecting the second possible selection associated with the element of the GUI, may further activate multiple pixels associated with a location of contact with the display with the second color. In one example, the multiple pixels may include multiple pixels of the GUI. In another example, the multiple pixels may include multiple pixels of a display. In one or more embodiments, the multiple pixels may be associated with a diameter that is associated with the second possible selection associated with the element of the GUI.

In one or more embodiments, a stylus may receive, via a rotary encoder of the stylus, first user input that is associated with a first possible selection associated with the element of a GUI; in response to receiving, via the rotary encoder, the first user input that is associated with the first possible selection associated with the element of the GUI: may provide first light emissions of a first color; and may provide first information that indicates a first partial rotation of the rotary encoder to an information handling system in a wireless fashion; may receive, via the rotary encoder, second user input that is associated with a second possible selection associated with the element of the GUI; in response to receiving, via the rotary encoder, the second user input that is associated with the second possible selection associated with the element of the GUI: may provide second light emissions of a second color, different from the first color; and may provide second information that indicates a second partial rotation of the rotary encoder to the information handling system in the wireless fashion; may receive third user input via the electromechanical switch that indicates a selection of the second possible selection associated with the element of the GUI; and may provide third information that indicates the selection of the second possible selection associated with the element of the GUI to the information handling system in the wireless fashion.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
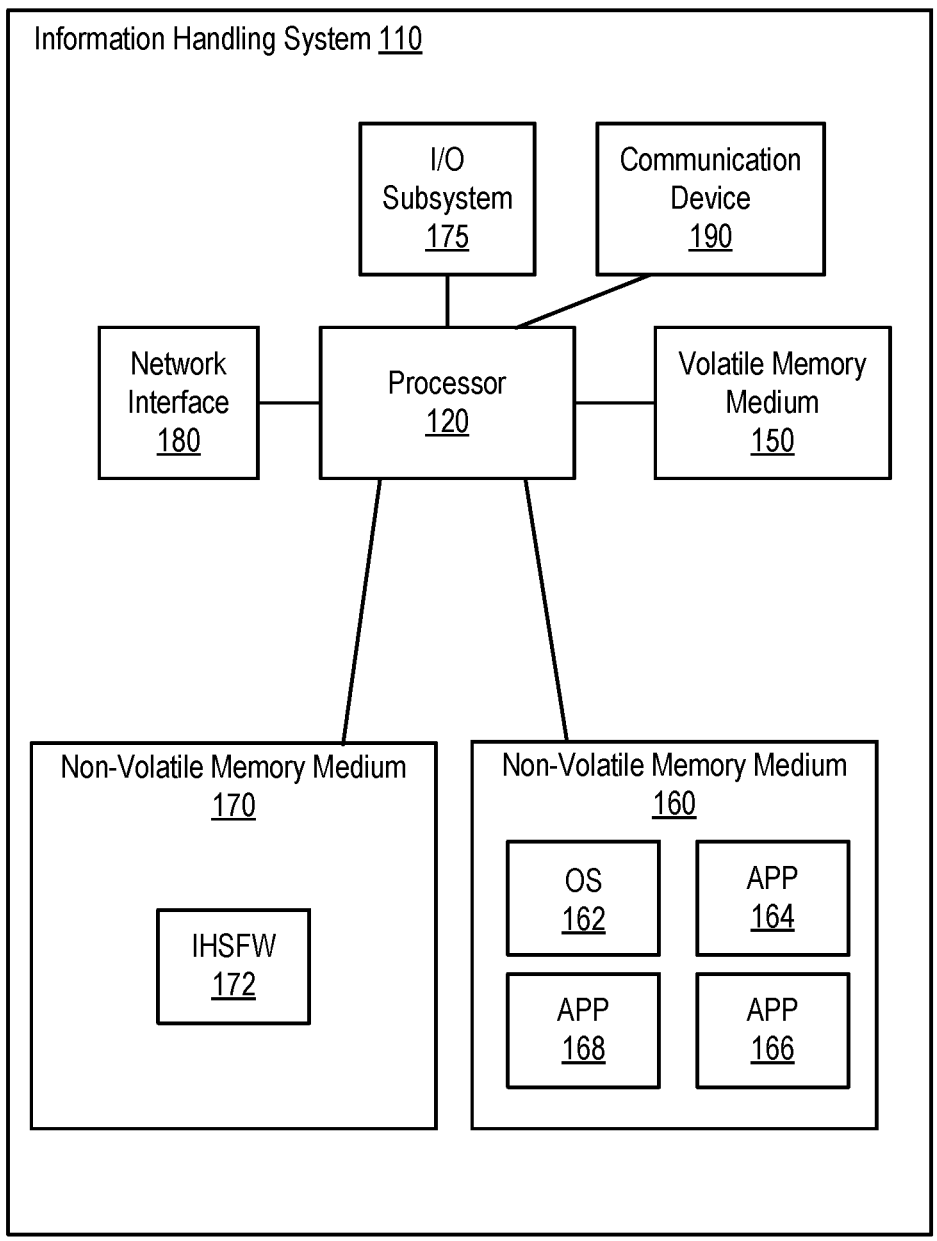
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a stylus may be utilized with user input. In one example, the user input may include selecting an icon with the stylus. In a second example, the user input may include writing with the stylus. In another example, the user input may include drawing with the stylus. In one or more embodiments, changing colors associated with the stylus and/or changing drawing widths associated with the stylus, a user may select a color and/or a drawing width from one or more menus of a graphical user interface (GUI). For example, these changes may occur in an amount of time.

In one or more embodiments, a stylus may include a rotary encoder. For example, the stylus may receive user input via the rotary encoder. In one instance, the user input, received via the rotary encoder, may indicate a color that may be utilized to draw. In another instance, the user input, received via the rotary encoder, may indicate a width that may be utilized to draw. In one or more embodiments, the stylus may provide the user input, received via the rotary encoder, to an information handling system. For example, the stylus may provide the user input, received via the rotary encoder, to the information handling system in a wireless fashion.

In one or more embodiments, the stylus may include a switch. For example, the stylus may receive user input via the switch. For instance, the user input received via the switch may indicate a selection (e.g., a selection of color, a selection of width, etc.). In one or more embodiments, the switch may be or include a momentary switch. For example, the user may actuate the switch with a digit (e.g., a finger, a thumb, etc.). For instance, the user may actuate the switch similar to clicking a mouse button or a trackpad button. In one or more embodiments, the rotary encoder may include the switch. In one or more embodiments, the switch may be or include an electromechanical switch.

In one or more embodiments, the stylus may include a light emissions device. For example, the light emissions device may include one or more light emitting diodes (LEDs). For instance, the light emissions device may include one or more of a red light emitting diode (LED), a green LED, and blue LED, among others. In one or more embodiments, the light emissions device may indicate a color that may be selected. In one example, the color may change when the user rotates the rotary encoder. In another example, the color may indicate a color that will be utilized to draw with the stylus. For instance, the color may indicate a color that will be utilized to draw with the stylus if the user selects the color.

In one or more embodiments, the stylus may be utilized to wirelessly control an information handling system. In one example, the stylus may be utilized to wirelessly control a processor clock setting of the information handling system. In a second example, the stylus may be utilized to wirelessly control an audio output setting associated with the information handling system. For instance, the stylus may be utilized to wirelessly control a volume of a speaker of the information handling system or coupled to the information handling system. In a third example, the stylus may be utilized to wirelessly control a brightness of a display of or coupled to the information handling system. In a fourth example, the stylus may be utilized to wirelessly control a contrast of a display of or coupled to the information handling system. In another example, the stylus may be utilized to wirelessly control a thermal setting of the information handling system.

In one or more embodiments, the user may actuate the switch of the stylus to cycle through different setting options. For example, the light emissions device may indicate a currently selected setting option. In one instance, the light emissions device may indicate a currently selected setting option via a color of light emissions. In another instance, the light emissions device may indicate a currently selected setting option via a number of flashes in a time period.

In one or more embodiments, the switch of the stylus may be actuated by the user to select a menu of a GUI. For example, the switch of the stylus may be actuated by the user to access a shortcut to a menu of a GUI. In one or more embodiments, the switch of the stylus may be actuated by the user to select a setting of the information handling system. For example, the switch of the stylus may be actuated by the user to confirm a setting of the information handling system.

In one or more embodiments, the rotary encoder of the stylus may be utilized as a scroll wheel. For example, the rotary encoder of the stylus may be utilized as a scroll wheel of a mouse. In one or more embodiments, the rotary encoder of the stylus may be utilized to switch between or among two or more applications executed by the information handling system. In one or more embodiments, the rotary encoder of the stylus may be utilized to switch between or among two or more windows. For example, the rotary encoder of the stylus may be utilized to switch between or among two or more windows of a GUI.

In one or more embodiments, the rotary encoder of the stylus may be utilized to rotate a graphic. In one example, the graphic may be or include a two-dimensional graphic or video. In another example, the graphic may be or include a three-dimensional graphic or video. For instance, a three-dimensional graphic or video may be a two-dimensional representation of a three-dimensional object or figure. In one or more embodiments, the rotary encoder of the stylus may be utilized to select a time in a timeline of a video. In one example, the time in the timeline of the video may be of a video player. In another example, the time in the timeline of the video may be of a video editor.

In one or more embodiments, the stylus may be utilized to control one or more components of the information handling system. In one example, the stylus may be utilized to control a radio transceiver of the information handling system. For instance, the stylus may be utilized to turn on and turn off an airplane mode of the information handling system. In a second example, the stylus may be utilized to control power consumption of the information handling system. For instance, the stylus may be utilized to control power saving of the information handling system. In another example, the stylus may be utilized to control a mode of the information handling system. For instance, the stylus may be utilized to control a tablet mode of the information handling system. In one or more embodiments, the stylus may be utilized to select a stylus mode. In one example, the stylus may be utilized to select a Microsoft pen protocol (MPP) mode. In another example, the stylus may be utilized to select a Wacom Active Electrostatic mode.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a communications device 190. As illustrated, volatile memory medium 150, non-volatile memory media 160 and 170, I/O subsystem 175, network interface 180, and communications device 190 may be communicatively coupled to processor 120.

In one or more embodiments, one or more of volatile memory medium 150, non-volatile memory media 160 and 170, I/O subsystem 175, network interface 180, and communications device 190 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

In one or more embodiments, communication device 190 may be or include a wireless communication device. For example, communication device 190 may communicate information with the stylus, or the other one or more peripheral devices, in a wireless fashion. For instance, communication device 190 may communicate the information via an ISM (industrial, scientific, and medical) band, among others. For instance, communication device 190 may communicate information with a stylus, or another one or more peripheral devices, in a wireless fashion. In one or more embodiments, communication device 190 may communicate via one or more of IEEE 802.11, WiFi, wireless Ethernet, IEEE 802.15, Bluetooth, Bluetooth Low Energy (BLE), IEEE 802.15.4, ZigBee, Z-Wave, 6LoWPAN, ANT, ANT+, ANT BLAZE, and a proprietary wireless protocol, among others.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
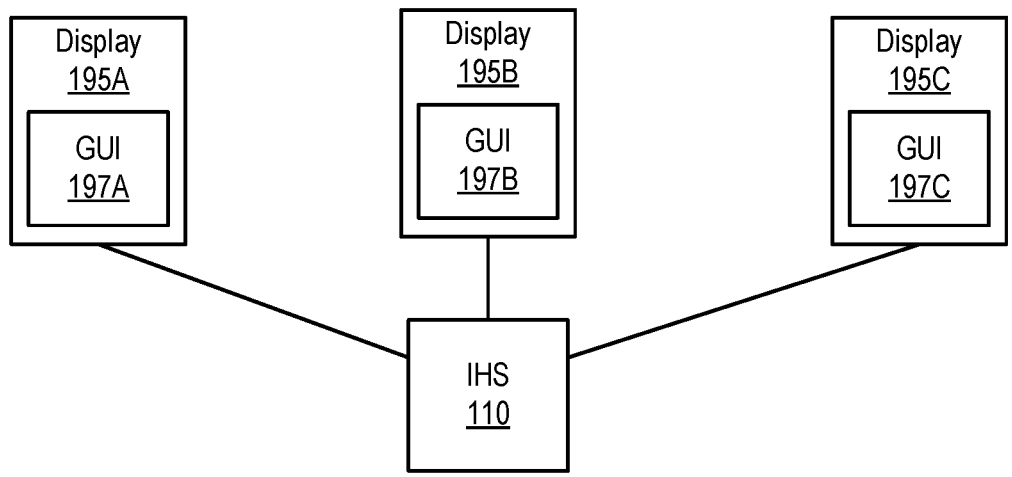
FIGS. 1B and 1C illustrate examples of displays and an example of an information handling system, according to one or more embodiments.
Figure 1C:
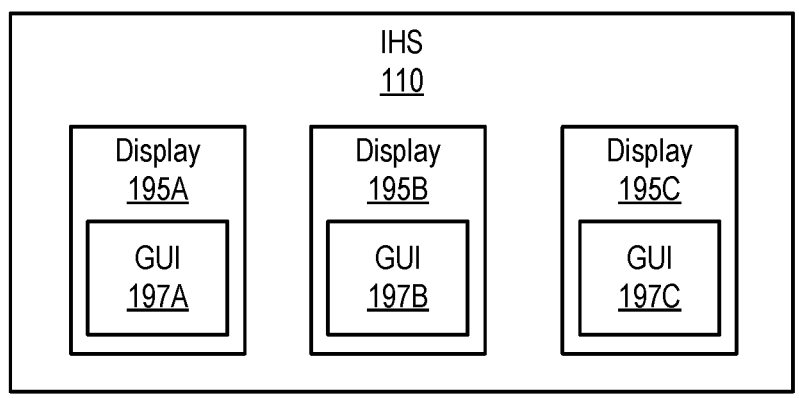

Turning now to FIGS. 1B and 1C, examples of displays and an example of an information handling system are illustrated, according to one or more embodiments. As shown in FIG. 1B, one or more of displays 195A-195C may be coupled to IHS 110. As illustrated in FIG. 1C, IHS 110 may include one or more of displays 195A-195C. As shown, displays 195A-195C may display graphical user interfaces (GUIs) 197A-197C, respectively. In one or more embodiments, display 195 may display information to one or more of a user and a camera, among others. In one or more embodiments, display 195 may be or include a touch screen. In one example, the touch screen may be or include a resistive touch screen. In another example, the touch screen may be or include a capacitive sensing touch screen. Although not specifically illustrated, display 195 may be communicatively coupled to processor 120, according to one or more embodiments. For example, display 195 may be communicatively coupled to processor 120 via one or more of a display adapter, a video controller, and a graphics processing unit, among others.

Figure 2A:
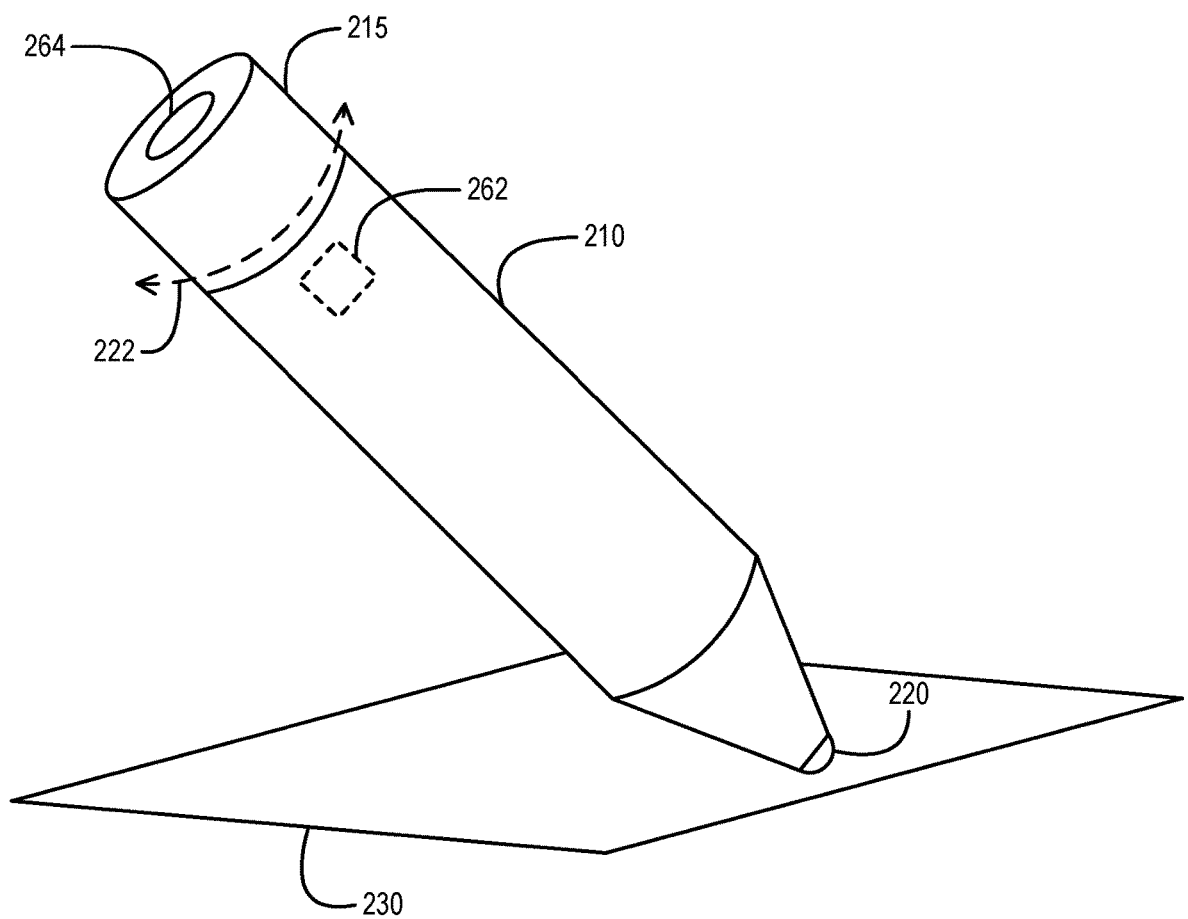
FIGS. 2A-2F illustrate examples of a stylus, according to one or more embodiments.

Turning now to FIGS. 2A-2E, examples of a stylus are illustrated, according to one or more embodiments. As shown in FIG. 2A, a stylus 210 may include a tip 220. In one or more embodiments, tip 220 may or may not be in contact with a surface 230. In one example, a user may not have tip 220 in contact with surface 230. In another example, the user may have tip 220 in contact with surface 230. In one or more embodiments, surface 230 may be or include any suitable surface. In one example, surface 230 may be or include a flat surface. In a second example, surface 230 may be or include a display (e.g., display 195). For instance, surface 230 may be or include a screen of a display (e.g., a screen of display 195). In another example, surface 230 may be or include a non-flat surface. For instance, surface 230 may include one or more depressions and/or one or more rises.

As illustrated, stylus 210 may include a knob 215. In one or more embodiments, a user may turn knob 215 to turn a rotary encoder 262. For example, the user may turn knob 215 as indicated by dashed arrows 222. In one instance, the user may turn knob 215 clockwise. In another instance, the user may turn knob 215 counterclockwise. As shown, stylus 210 may include rotary encoder 262. As illustrated, stylus 210 may include a switch 264. In one or more embodiments, a user may actuate switch 264.

In one or more embodiments, a rotary encoder may be or include an electro-mechanical device that may convert an angular position or an angular motion of a shaft or an axle to analog output signals or digital output signals. In one example, a rotary encoder may be or include an absolute rotary encoder. For instance, output of an absolute rotary encoder may indicate a current shaft position (e.g., an angle transducer). In another example, a rotary encoder may be or include an incremental rotary encoder. For instance, an incremental rotary encoder output of may provide information associated with motion of the shaft. In one or more embodiments, the information associated with motion of the shaft may be processed by a processor. For example, the process may process the information associated with motion of the shaft to determine one or more positions of the shaft, one or more positions angular velocities of the shaft, and/or one or more positions angular distances traveled by the shaft.

Figure 2B:
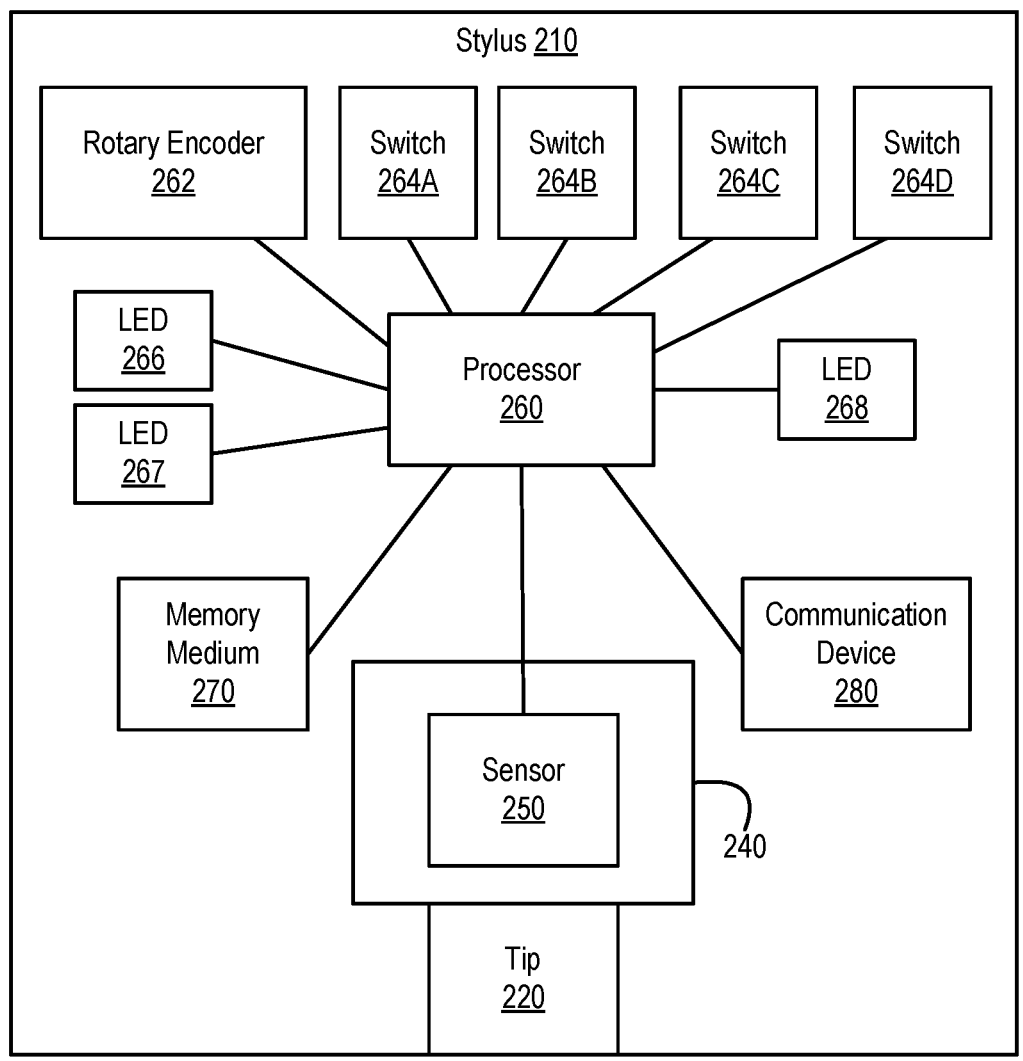

As shown in FIG. 2B, stylus 210 may include a pressure sensing device 240. In one or more embodiments, pressure sensing device 240 may determine a force of pressure of tip 220 in contact with surface 230. For example, pressure sensing device 240 may include one or more of an elastomer material and a spring, among others. In one instance, pressure sensing device 240 may determine a force of pressure of tip 220 in contact with surface 230 via a compression of the one or more of the elastomer material and the spring. In another instance, pressure sensing device 240 may determine a force of pressure of tip 220 in contact with surface 230 via an elongation of the one or more of the elastomer material and the spring. In one or more embodiments, pressure sensing device 240 may be referred to as a force sensing device.

In one or more embodiments, pressure sensing device 240 may provide one or more output signals that indicate one or more forces of pressure of tip 220 in contact with surface 230. In one example, pressure sensing device 240 may provide one or more output digital signals that indicate the one or more forces of pressure. In another example, pressure sensing device 240 may provide one or more output analog signals that indicate the one or more forces of pressure. For instance, the one or more output analog signals may be or include one or more voltages.

As shown, pressure sensing device 240 may include a sensor 250. In one or more embodiments, sensor 250 may determine a force of tip 220 in contact with surface 230. For example, sensor 250 may be or include one or more micro-electromechanical systems (MEMS) that may determine a force of tip 220 in contact with surface 230. In one or more embodiments, sensor 250 may include a strain gauge. For example, the strain gauge may output one or more voltages. For instance, the one or more voltages may be associated with one or more compressions and/or one or more elongations of the strain gauge. In one or more embodiments, a voltage from the strain gauge may be converted into digital data. For example, an analog to digital conversion (ADC) system, method, and/or process may convert an analog voltage from the strain gauge into digital data. In one instance, pressure sensing device 240 may include ADC circuitry that may convert one or more analog signals into digital data. In another instance, a processor 260 may include ADC circuitry that may convert one or more analog signals into digital data.

As illustrated, stylus 210 may include processor 260, memory medium 270, and communication device 280. As shown, pressure sensing device 240, memory medium 270, and communication device 280 may be coupled to processor 260. In one or more embodiments, processor 260 may execute processor instructions in implementing at least a portions of one or more systems, flowcharts, methods, and/or processes described herein. In one example, processor 260 may execute processor instructions from memory medium 270 in implementing at least a portion of one or more systems, flowcharts, methods, and/or processes described herein. For instance, memory medium 270 may include the processor instructions. In another example, processor 260 may execute processor instructions via communication device 280 in implementing at least a portion of one or more systems, flowcharts, methods, and/or processes described herein. For instance, communication device 280 may receive processor instructions and provide the processor instructions to one or more of processor 260 and memory medium 270.

As shown, rotary encoder 262 may be coupled to processor 260. As illustrated, switches 264A-264D may be coupled to processor 260. As shown, stylus 210 may include LEDs 266-268. As illustrated, LEDs 266-268 may be coupled to processor 260. In one or more embodiments, LEDs 266-268 may provide light emissions. In one example, LED 266 may provide red light emissions. In a second example, LED 267 may provide green light emissions. In another example, LED 268 may provide blue light emissions. In one or more embodiments, light emissions from LEDs 266-268 may provide light emissions in a visible light spectrum. For example, light emissions from LEDs 266-268 may combine to provide light emissions in a visible light spectrum. In one or more embodiments, a single device may include two or more of LEDs 266-268. In one or more embodiments, rotary encoder 262 may include two or more of LEDs 266-268. In one or more embodiments, light emissions from one or more of LEDs 266-268 may be provided via knob 215. In one example, light emissions from one or more of LEDs 266-268 may be provided via port of knob 215. In a second example, knob 215 may be translucent. In another example, knob 215 may be transparent.

In one or more embodiments, communication device 280 may communicate information with IHS 110. In one example, communication device 280 may communicate the information to IHS 110 in a wired fashion. In another example, communication device 280 may communicate the information to IHS 110 in a wireless fashion. For instance, communication device 280 may be or include a wireless communication device. In one or more embodiments, communication device 280 may communicate the information to IHS 110 via an ISM (industrial, scientific, and medical) band, among others. In one or more embodiments, communication device 280 may communicate via one or more of IEEE 802.11, WiFi, wireless Ethernet, IEEE 802.15, Bluetooth, BLE, IEEE 802.15.4, ZigBee, Z-Wave, 6LoWPAN, ANT, ANT+, ANT BLAZE, and a proprietary wireless protocol, among others.

In one or more embodiments, the information may be associated with one or more forces of pressure of tip 220 in contact with surface 230. In one or more embodiments, the information may be associated with one or more actuations of one or more of switches 264A-264D. In one or more embodiments, the information may be associated with one or more partial rotations of knob 215. For example, rotary encoder 262 may be utilized in determining the one or more partial rotations of knob 215.

Figure 2C:
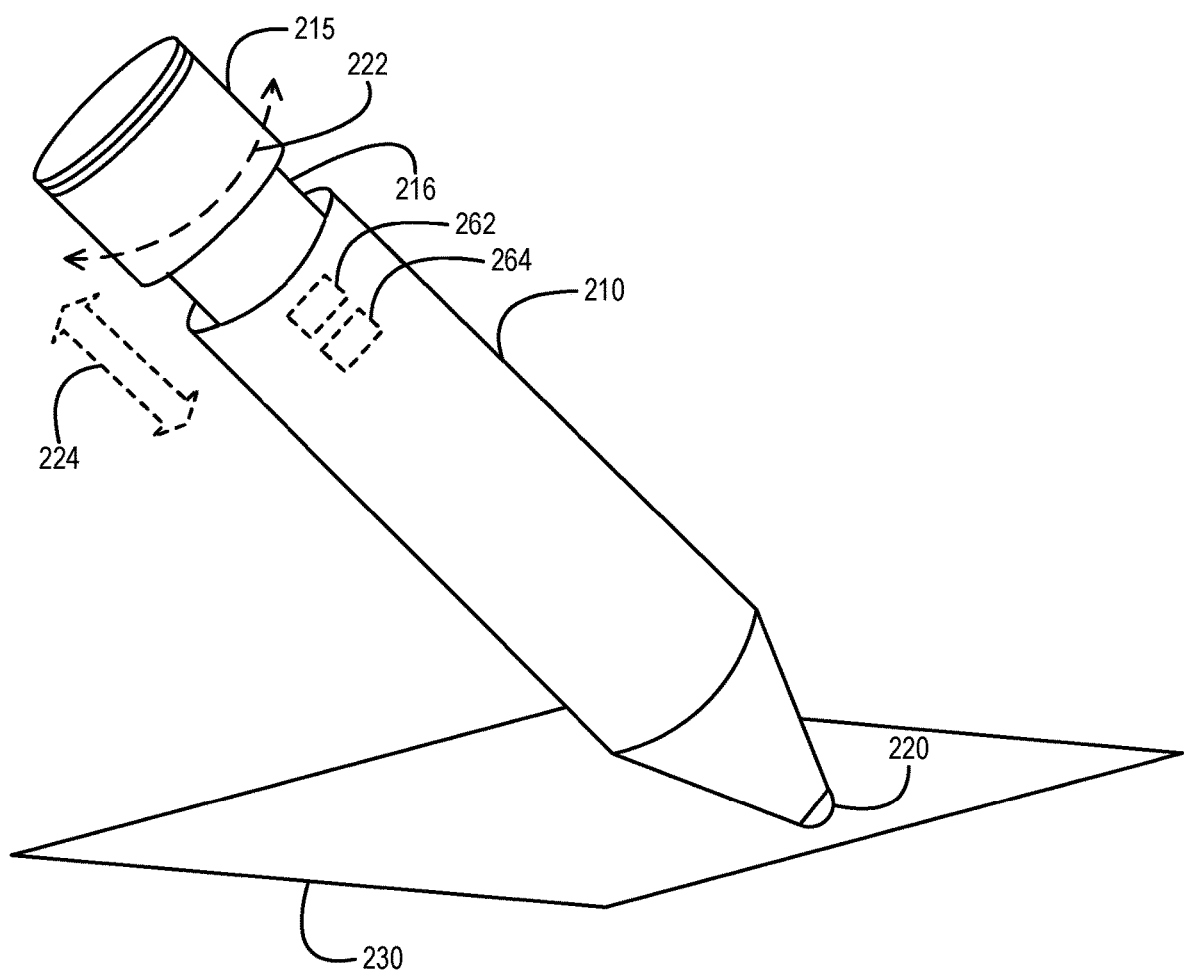

As illustrated in FIG. 2C, knob 215 may be coupled to a shaft 216. For example, stylus 210 may include shaft 216. In one or more embodiments, knob 215 may rotate shaft 216. For example, shaft 216 may rotate rotary encoder 262. In one or more embodiments, shaft 216 may be coupled to switch 264. For example, shaft 216 may be utilized in actuating switch 264. For instance, a user may press knob 215, and switch 264 may be actuated via one or more of press knob 215 and shaft 216. As shown, one or more of press knob 215 and shaft 216 may travel in directions of dashed arrows 224. As illustrated, one or more of press knob 215 and shaft 216 may be rotated in directions of dashed arrows 222. In one or more embodiments, rotary encoder 262 and switch 264 may be combined. In one example, rotary encoder 262 may include switch 264. In another example, switch 264 may include rotary encoder 262.

Figure 2D:
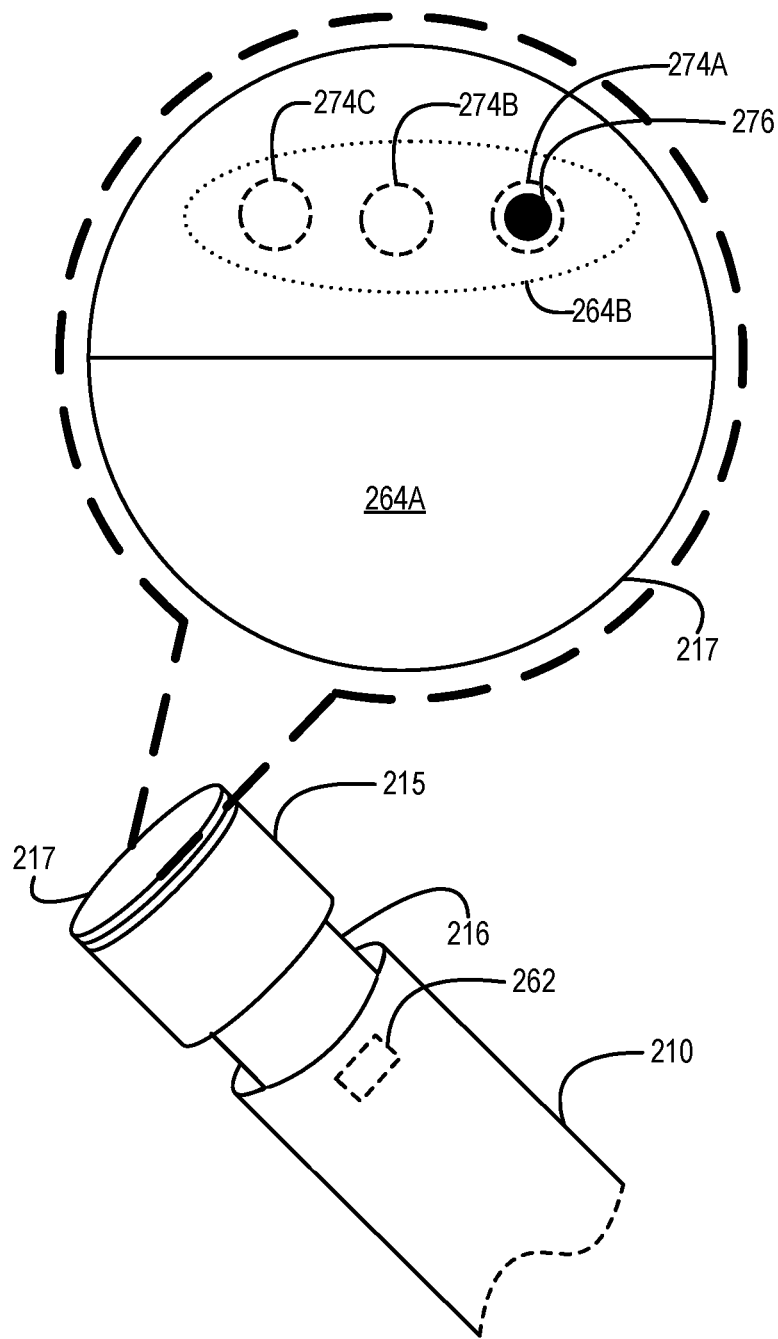

As shown in FIG. 2D, a top 217 of knob 215 may include switches 264A and 264B. In one example, a first portion of top 217 may include switch 264A. In another example, a second portion of top 217 may include switch 264B. In one or more embodiments, switch 264B may be or include a multiple position switch. For example, switch 264B may be or include a slide switch. As illustrated, a slider 276 may be slide to a position of positions 274A-274C.

In one or more embodiments, a position of positions 274A-274C may indicate an operating mode. In one example, a position of positions 274A-274C may indicate an operating mode of an application (e.g., an application of APPs 164-168). In a second example, a position of positions 274A-274C may indicate an operating mode of IHS 110. In another example, a position of positions 274A-274C may indicate an operating mode of stylus 210.

In one or more embodiments, when position 274A is selected, stylus 210 may be in a powered down mode. In one example, stylus 210 may be completely powered off. In another example, stylus 210 may be in a sleep mode. For instance, processor 260 may be in a low power mode, and selecting a position of 274B or 274C may activate (e.g., wake-up) stylus 210. In one or more embodiments, when position 274B is selected, one or more settings of stylus 210 may be configured. For example, stylus 210 may be configured to one or more of a pencil mode, a pen mode, a marker mode, an oil brush mode, and a watercolor mode, among others. For instance, rotary encoder 262 may be utilized to configure stylus 210 to the one or more of the pencil mode, the pen mode, the marker mode, the oil brush mode, and the watercolor mode, among others. In one or more embodiments, when position 274C is selected, one or more settings of IHS 110 may be configured. In one example, a power mode of IHS 110 may be configured. In another example, an output audio level of a speaker associated with IHS 110 may be configured.

Figure 2E:
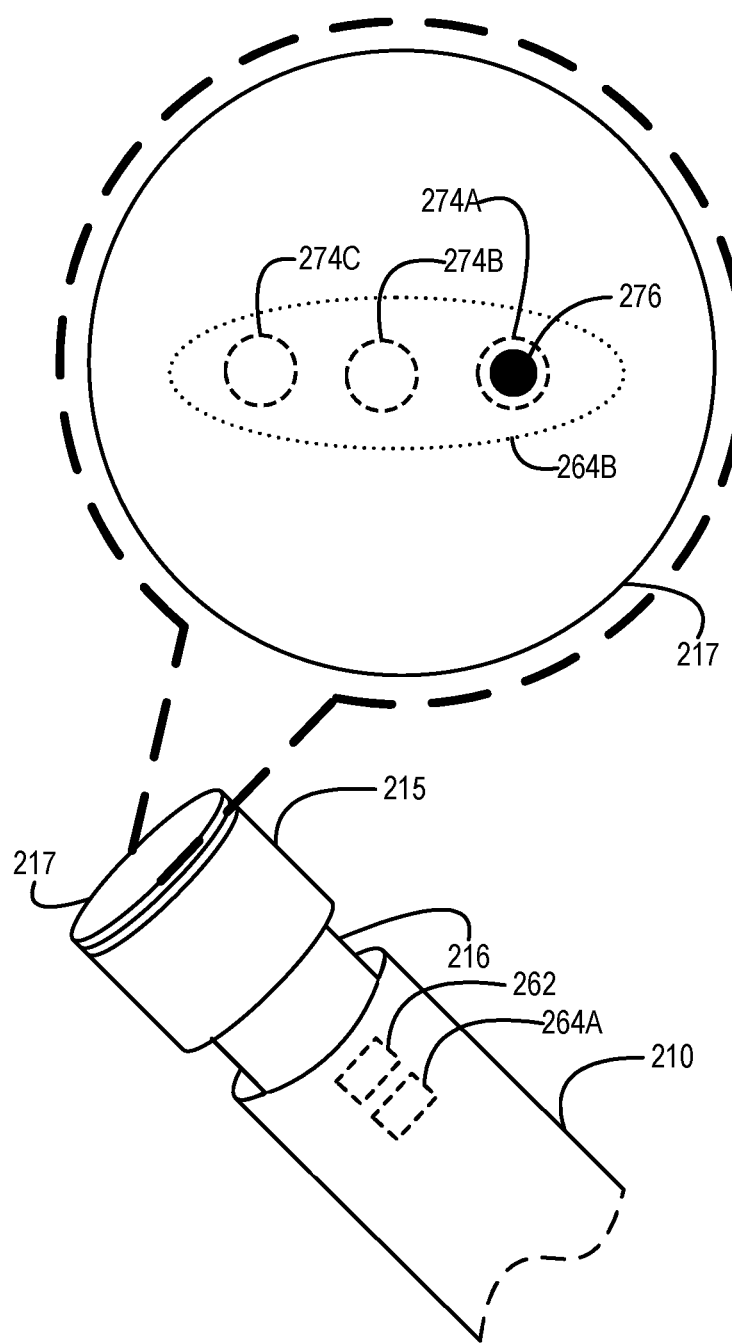
Figure 2F:
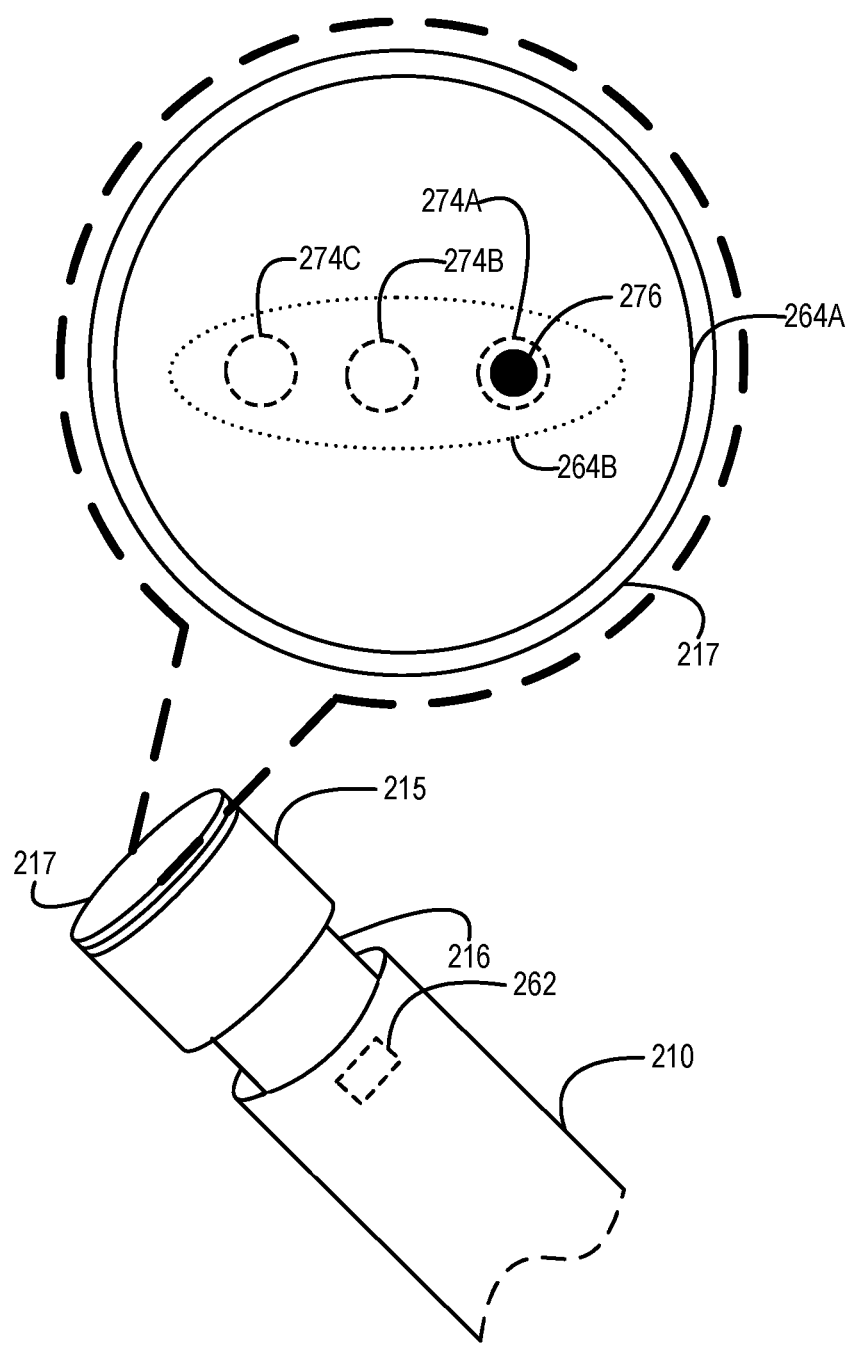

As shown in FIG. 2E, top 217 of knob 215 may include switch 264A. In one or more embodiments, a user may press knob 215. For example, switch 264A may be actuated via one or more of press knob 215 and shaft 216. As illustrated in FIG. 2F, switch 264A may include switch 264B.

In one or more embodiments, knob 215 may include two or more of LEDs 266-268. In one or more embodiments, shaft 216 may be or include a light pipe. For example, shaft 216 may transmit light emissions from one or more of LEDs 266-268. In one example, shaft 216 may transmit light emissions from one or more of LEDs 266-268 to a user. In another example, shaft 216 may transmit light emissions from one or more of LEDs 266-268 to knob 215.

Figure 3A:
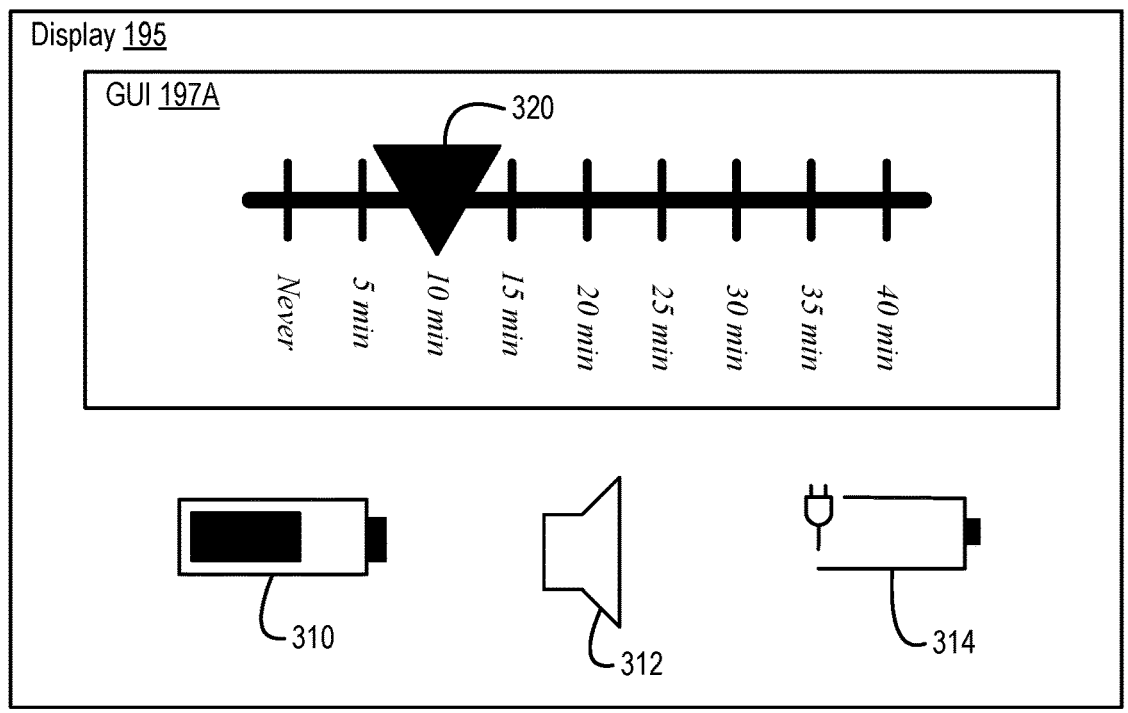
FIG. 3A illustrates an example of utilizing a stylus with a graphical user interface, according to one or more embodiments.

Turning now to FIG. 3A, an example of utilizing a stylus with a graphical user interface is illustrated, according to one or more embodiments. As shown, display 195 may display icons 310-314. In one or more embodiments, an icon of icons 310-314 may be or include an element of a GUI. In one or more embodiments, a user may utilize stylus 210 to select an icon of icons 310-314. For example, the user may utilize stylus 210 to select icon 310. For instance, icon 310 may be associated with one or more power configurations of IHS 110. In one or more embodiments, GUI 197A may be displayed via display 195 in response to user input selecting icon 310.

As illustrated, GUI 197A may display a GUI element that includes a selection slider 320. In one or more embodiments, a pointing device (e.g., a mouse, a trackball, a track pad, etc.) may be utilized to slide selection slider 320 to a configuration setting. For example, selection slider 320 may be utilized to select an amount of time that may transpire before IHS 110 is placed in a low power mode (e.g., a sleep mode). For instance, selection slider 320 may be utilized to select an amount of time that may transpire while IHS 110 is idle before IHS 110 is placed in a low power mode (e.g., a sleep mode). As shown, possible configuration settings may include "Never", "5 min", "10 min", "15 min", "20 min", "25 min", "30 min", "35 min", and "40 min".

In one or more embodiments, stylus 210 may be utilized to slide selection slider 320 to a configuration setting. In one example, tip 220 may be slid along surface 230 to select a configuration setting. In another example, knob 215 may be rotated to select a configuration setting. For instance, selection slider 320 may slide among possible configuration settings in response to one or more partial rotations of knob 215. In one or more embodiments, the one or more partial rotations of knob 215 may be determined utilizing rotary encoder 262. In one or more embodiments, a switch of stylus 210 may be actuated to confirm and/or to set the configuration setting. In one example, switch 264 (illustrated in FIGS. 2A and 2C) may be actuated to confirm and/or to set the configuration setting. In another example, switch 264A (illustrated in FIGS. 2D-2F) may be actuated to confirm and/or to set the configuration setting.

Figure 3B:
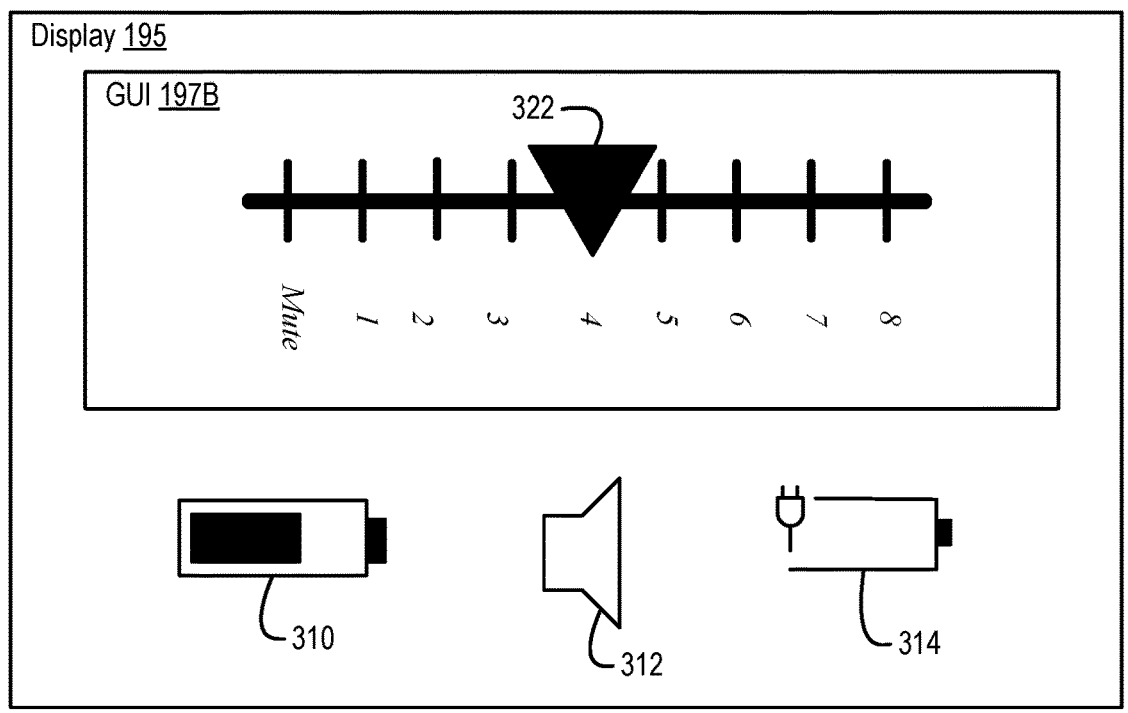
FIG. 3B illustrates a second example of utilizing a stylus with a graphical user interface, according to one or more embodiments.

Turning now to FIG. 3B, a second example of utilizing a stylus with a graphical user interface is illustrated, according to one or more embodiments. As shown, display 195 may display icons 310-314. In one or more embodiments, an icon of icons 310-314 may be or include an element of a GUI. In one or more embodiments, a user may utilize stylus 210 to select an icon of icons 310-314. For example, the user may utilize stylus 210 to select icon 312. For instance, icon 312 may be associated with one or more volume configurations of a speaker associated with IHS 110. In one or more embodiments, GUI 197B may be displayed via display 195 in response to user input selecting icon 312.

As illustrated, GUI 197B may display a GUI element that includes a selection slider 322. In one or more embodiments, a pointing device (e.g., a mouse, a trackball, a track pad, etc.) may be utilized to slide selection slider 322 to a configuration setting. For example, selection slider 322 may be utilized to select an output volume. For instance, selection slider 322 may be utilized to select an output volume of at least one speaker associated with IHS 110. As shown, possible configuration settings may include "Mute", "1", "2", "3", "4", "5", "6", "7", and "8".

In one or more embodiments, stylus 210 may be utilized to slide selection slider 322 to a configuration setting. In one example, tip 220 may be slid along surface 230 to select a configuration setting. In another example, knob 215 may be rotated to select a configuration setting. For instance, selection slider 322 may slide among possible configuration settings in response to one or more partial rotations of knob 215. In one or more embodiments, the one or more partial rotations of knob 215 may be determined utilizing rotary encoder 262. In one or more embodiments, a switch of stylus 210 may be actuated to confirm and/or to set the configuration setting. In one example, switch 264 (illustrated in FIGS. 2A and 2C) may be actuated to confirm and/or to set the configuration setting. In another example, switch 264A (illustrated in FIGS. 2D-2F) may be actuated to confirm and/or to set the configuration setting.

Figure 3C:
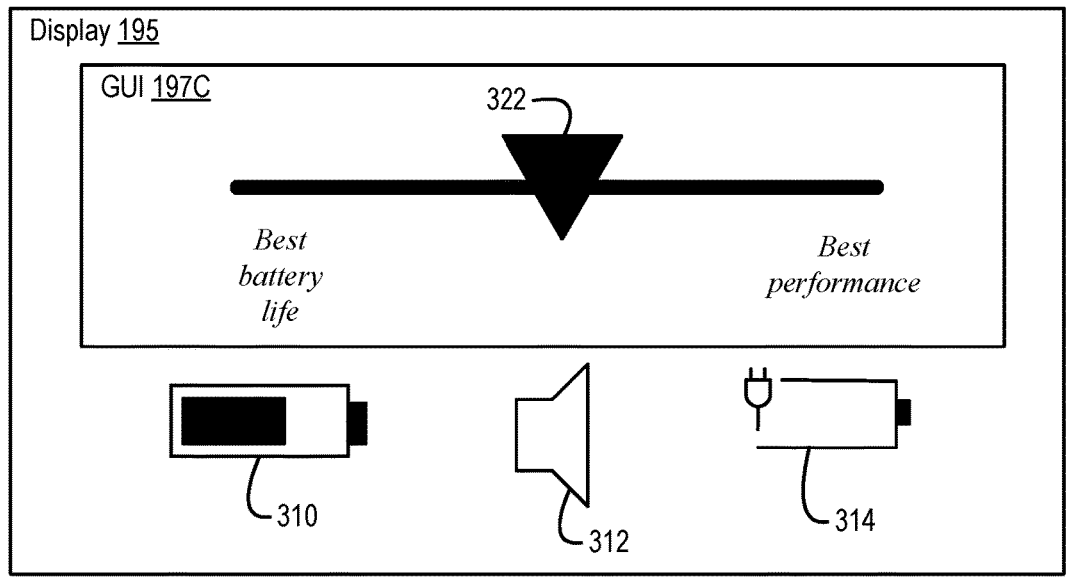
FIG. 3C illustrates a third example of utilizing a stylus with a graphical user interface, according to one or more embodiments.

Turning now to FIG. 3C, a third example of utilizing a stylus with a graphical user interface is illustrated, according to one or more embodiments. As shown, display 195 may display icons 310-314. In one or more embodiments, an icon of icons 310-314 may be or include an element of a GUI. In one or more embodiments, a user may utilize stylus 210 to select an icon of icons 310-314. For example, the user may utilize stylus 210 to select icon 314. For instance, icon 314 may be associated with one or more volume configurations of power utilization of IHS 110. In one or more embodiments, GUI 197C may be displayed via display 195 in response to user input selecting icon 314.

As illustrated, GUI 197C may display a GUI element that includes a selection slider 322. In one or more embodiments, a pointing device (e.g., a mouse, a trackball, a track pad, etc.) may be utilized to slide selection slider 322 to a configuration setting. For example, selection slider 322 may be utilized to select a power utilization configuration of IHS 110.

As shown, a range of power utilization configurations of IHS 110 may be selected via slider 322. In one or more embodiments, the range of power utilization configurations of IHS 110 may be from "Best battery life" to "Best performance". In one example, a configuration setting of "Best battery life" may conserve power from a battery of IHS 110. For instance, data processing performance, graphics processing performance, etc. may be sacrificed to conserve power from the battery of IHS 110.

In another example, a configuration setting of "Best performance" may not conserve power from a battery of IHS 110. For instance, power from the battery of IHS 110 may be sacrificed for maximum data processing performance, graphics processing performance, etc.

In one or more embodiments, slider 322 may be utilized to configure a power utilization configuration of IHS 110. In one example, slider 322 may be utilized to configure a "Best battery life" power utilization configuration of IHS 110. In a second example, slider 322 may be utilized to configure a "Best performance" power utilization configuration of IHS 110. In another example, slider 322 may be utilized to configure a "power utilization configuration of IHS 110 between a Best battery life" power utilization configuration of IHS 110 and a "Best performance" power utilization configuration of IHS 110.

In one or more embodiments, stylus 210 may be utilized to slide selection slider 322 to a configuration setting. In one example, tip 220 may be slid along surface 230 to select a configuration setting. In another example, knob 215 may be rotated to select a configuration setting. For instance, selection slider 322 may slide among possible configuration settings in response to one or more partial rotations of knob 215. In one or more embodiments, the one or more partial rotations of knob 215 may be determined utilizing rotary encoder 262. In one or more embodiments, a switch of stylus 210 may be actuated to confirm and/or to set the configuration setting. In one example, switch 264 (illustrated in FIGS. 2A and 2C) may be actuated to confirm and/or to set the configuration setting. In another example, switch 264A (illustrated in FIGS. 2D-2F) may be actuated to confirm and/or to set the configuration setting. In one or more embodiments, a configuration setting may be set based at least on one or more partial rotations of knob 215. For example, a configuration setting may be set based at least on one or more partial rotations of knob 215 without actuating a switch of stylus 210 to confirm and/or to set the configuration setting.

Figure 3D:
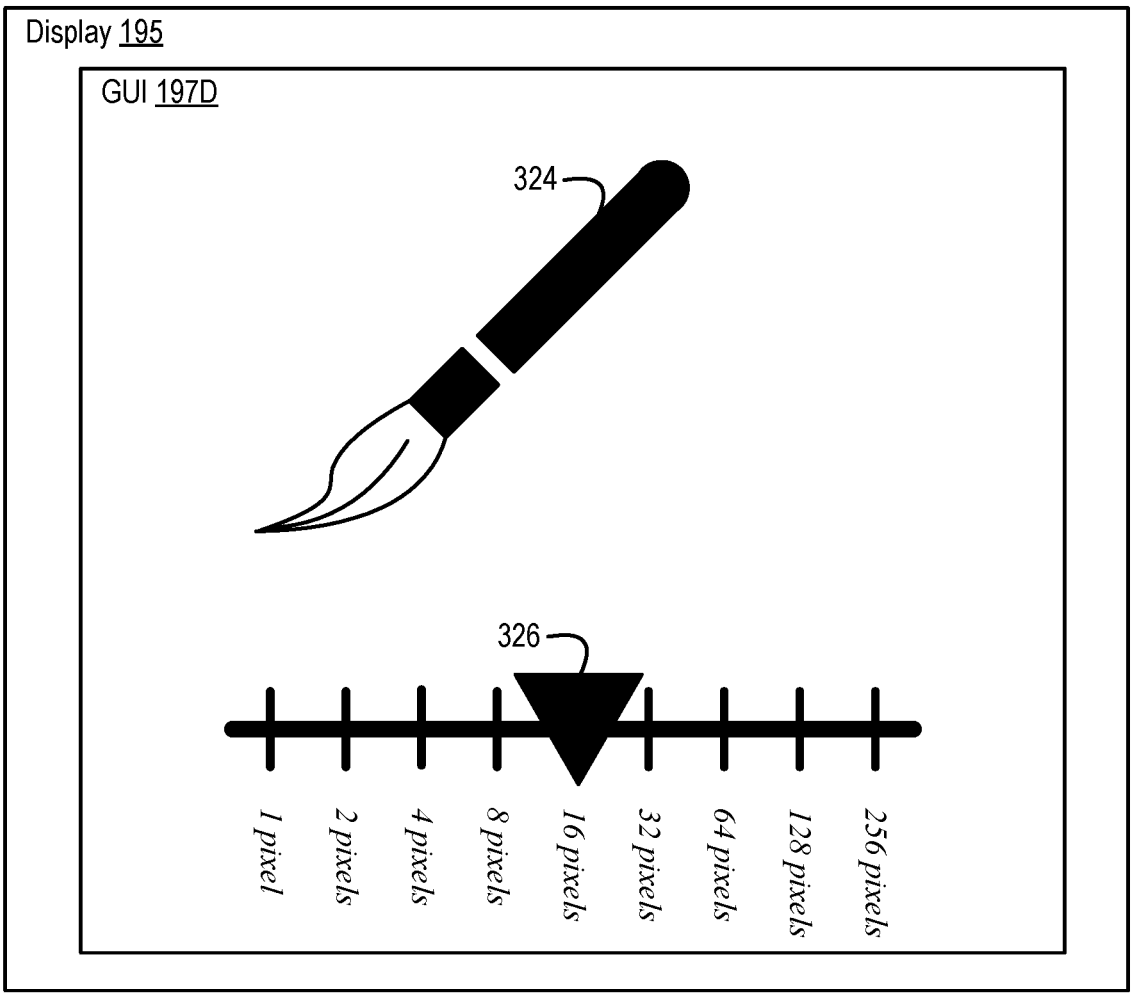
FIGS. 3D and 3E illustrate another example of utilizing a stylus with a graphical user interface, according to one or more embodiments.
Figure 3E:
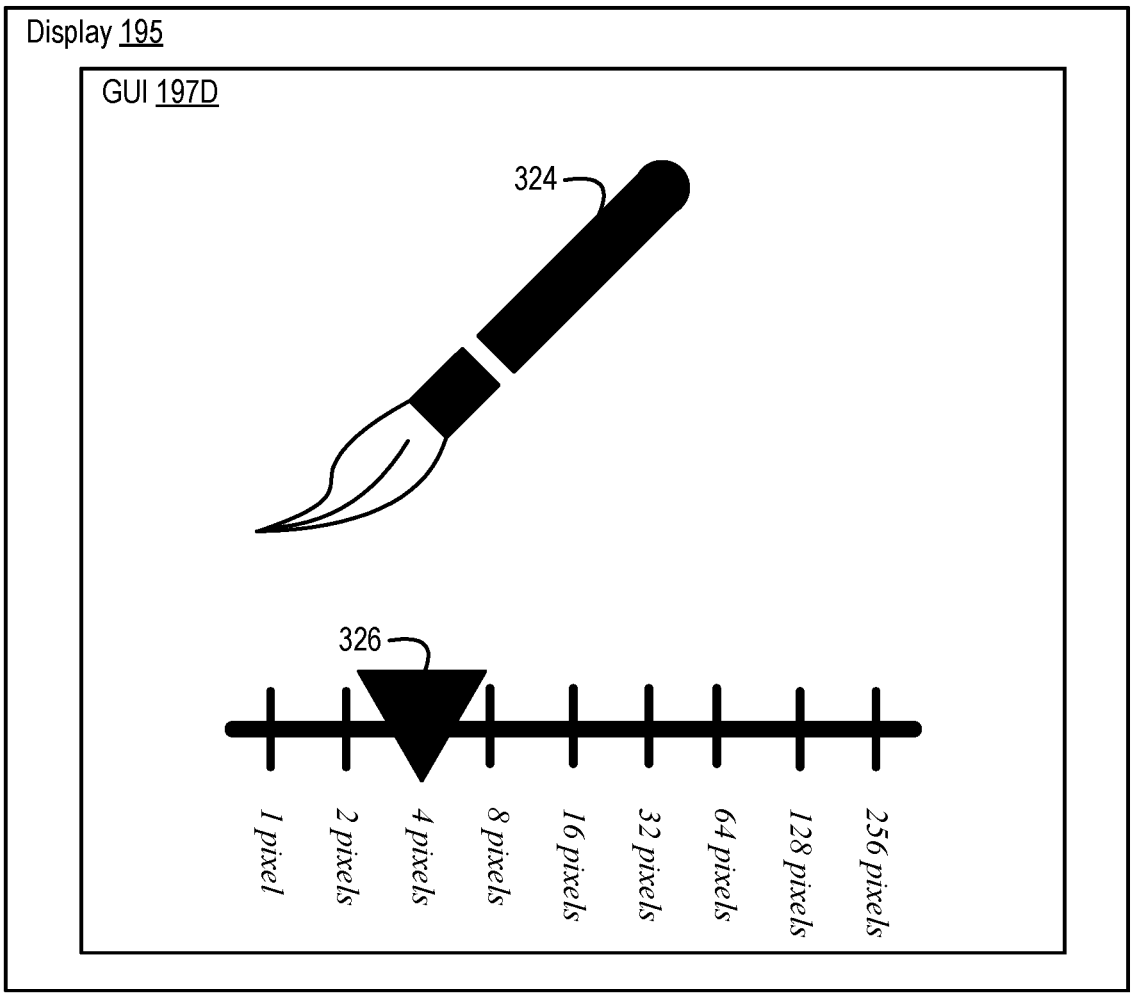

Turning now to FIGS. 3D and 3E, another example of utilizing a stylus with a graphical user interface is illustrated, according to one or more embodiments. As shown, display 195 may display icon 324. In one or more embodiments, icon 324 may be or include an element of a GUI 197D. In one or more embodiments, a user may utilize stylus 210 to select icon 324. For example, icon 324 may be associated with one or more width configurations of a paintbrush. In one or more embodiments, a slider that includes a selection slider 326 may be displayed via display 195 in response to user input selecting icon 324.

As illustrated, GUI 197D may display a GUI element that includes a selection slider 326. In one or more embodiments, a pointing device (e.g., a mouse, a trackball, a track pad, etc.) may be utilized to slide selection slider 326 to a configuration setting. For example, selection slider 326 may be utilized to select a width of a paintbrush. As shown, possible configuration settings may include "1 pixel", "2 pixels", "4 pixels", "8 pixels", "16 pixels", "32 pixels", "64 pixels", "128 pixels", and "256 pixels".

In one or more embodiments, stylus 210 may be utilized to slide selection slider 326 to a configuration setting. In one example, tip 220 may be slid along surface 230 to select a configuration setting. In another example, knob 215 may be rotated to select a configuration setting. For instance, selection slider 326 may slide among possible configuration settings in response to one or more partial rotations of knob 215. In one or more embodiments, the one or more partial rotations of knob 215 may be determined utilizing rotary encoder 262. In one example, rotary encoder 262 may receive user input that selects "16 pixels", illustrated in FIG. 3D. For instance, "16 pixels" may be a drawing width. In another example, rotary encoder 262 may receive user input that selects "4 pixels", illustrated in FIG. 3E. For instance, "4 pixels" may be a drawing width. In one or more embodiments, a switch of stylus 210 may be actuated to confirm and/or to set the configuration setting. In one example, switch 264 (illustrated in FIGS. 2A and 2C) may be actuated to confirm and/or to set the configuration setting. In another example, switch 264A (illustrated in FIGS. 2D-2F) may be actuated to confirm and/or to set the configuration setting. Although FIGS. 3D and 3E are associated with selecting a width of a paintbrush mode, selecting a width of one or more of a pencil mode, a pen mode, a marker mode, an oil brush mode, and a watercolor mode, among others, may be selected in a same or a similar fashion, according to one or more embodiments.

Figure 4A:
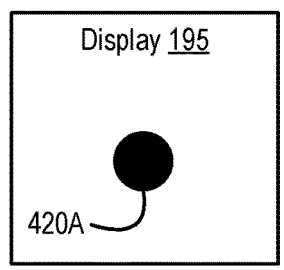
FIGS. 4A-4C illustrate examples of digital markings, according to one or more embodiments.
Figure 4B:
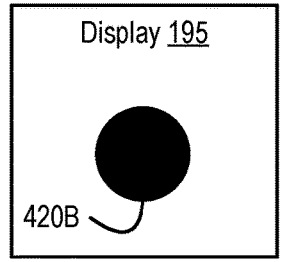
Figure 4C:
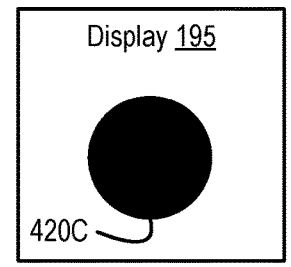

Turning now to FIGS. 4A-4C, examples of digital markings are illustrated, according to one or more embodiments. In one or more embodiments, a display 195 may show digital markings to a user and/or a camera. For example, the digital markings may be associated with a selected width. For instance, the digital markings may be associated with one or more stylus utilization modes.

As illustrated, display 195 may show a digital marking 420. In one or more embodiments, display 195 may show a digital marking 420 (e.g., digital inking), via a number of pixels of a display (e.g., display 195), in response to stylus 210 contacting surface 230. In one example, display 195 may show digital marking 420A in response to stylus 210 contacting surface 230, when a first width is utilized, illustrated in FIG. 4A. In a second example, display 195 may show digital marking 420B in response to stylus 210 contacting surface 230, when a second width is utilized, illustrated in FIG. 4B. In another example, display 195 may show digital marking 420C in response to stylus 210 contacting surface 230, when a third width is utilized, illustrated in FIG. 4C. In one or more embodiments, a width of a digital marking 420 may be a diameter of digital marking 420.

In one or more embodiments, digital marking 420 may be associated with a diameter. In one example, digital marking 420A may be associated with a first diameter. In a second example, digital marking 420B may be associated with a second diameter. For instance, the second diameter may be greater than the first diameter. In another example, digital marking 420C may be associated with a third diameter. In one or more embodiments, a diameter may be a number of pixels. For example, a number of pixels of a diameter may be selected via selection slider 326, illustrated in FIG. 3D. In one or more embodiments, digital marking 420 may include an activation of one or more pixels and/or a deactivation of one or more other pixels. For example, the activation of the one or more pixels and/or the deactivation of the one or more other pixels may produce one or more shapes.

Figure 5:
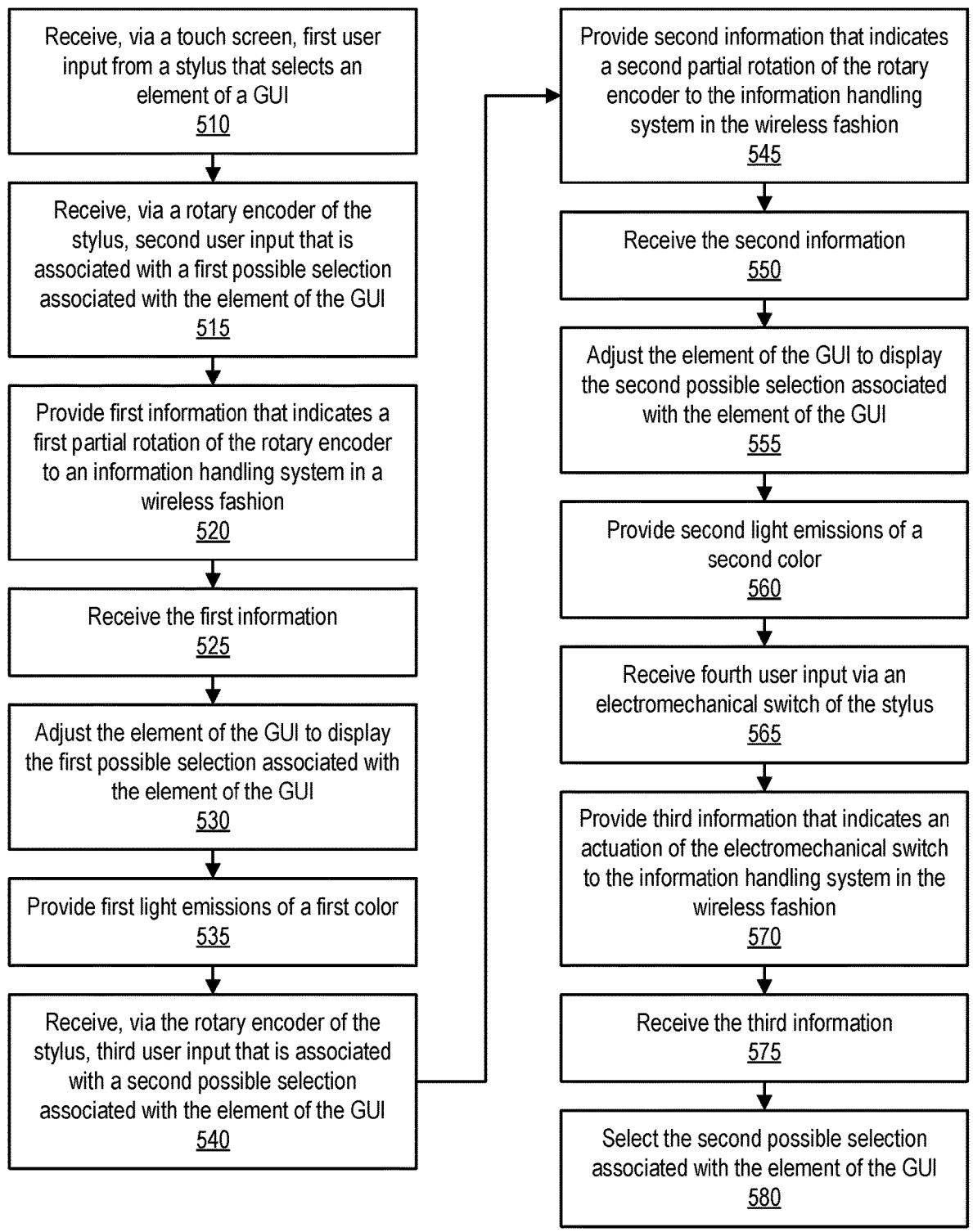
FIG. 5 illustrates an example of a method, according to one or more embodiments.

Turning now to FIG. 5, an example of a method is illustrated, according to one or more embodiments. At 510, first user input may be received, via a touch screen, from a stylus that selects an element of a GUI. For example, display 195 may include a touch screen. For instance, display 195 may receive first user input from a stylus that selects an element of a GUI. In one or more embodiments, a GUI element may be or include an icon and/or a graphical button. In one or more embodiments, a desktop GUI environment may be or include the GUI. For example, an element of a GUI may be or include an icon of icons 310-314. For instance, an element of a desktop GUI may be or include an icon of icons 310-314.

At 515, second user input that is associated with a first possible selection associated with the element of the GUI may be received via a rotary encoder of the stylus. For example, rotary encoder 262 may receive the second user input that selects "16 pixels", illustrated in FIG. 3D.

At 520, first information that indicates a first partial rotation of the rotary encoder may be provided to an information handling system in a wireless fashion. For example, stylus 210 may provide first information that indicates a first partial rotation of rotary encoder 262 to IHS 110 in a wireless fashion. For instance, stylus 210 may provide, via communication device 280, first information that indicates a first partial rotation of rotary encoder 262 to IHS 110 in a wireless fashion. In one or more embodiments, providing first information that indicates a first partial rotation of the rotary encoder to an information handling system in a wireless fashion may be performed in response to receiving, via the rotary encoder of a stylus, the second user input that is associated with the first possible selection associated with the element of the GUI.

At 525, the first information may be received. For example, IHS 110 may receive the first information in the wireless fashion. For instance, IHS 110 may receive the first information in the wireless fashion via communication device 190.

At 530, the element of the GUI may be adjusted to display the first possible selection associated with the element of the GUI. For example, IHS 110 may adjust the element of the GUI to display the first possible selection associated with the element of the GUI. For instance, IHS 110 may adjust icon 326 to "16 pixels". In one or more embodiments, adjusting the element of the GUI to display the first possible selection associated with the element of the GUI may be performed in response to receiving the first information.

At 535, first light emissions of a first color may be provided. For example, stylus 210 may provide first light emissions of a first color. For instance, one or more of LEDs 266-268 may provide first light emissions of a first color. In one or more embodiments, providing first light emissions of a first color may be performed in response to receiving, via the rotary encoder of the stylus, the second user input that is associated with the first possible selection associated with the element of the GUI. In one or more embodiments, processor 260 may control the one or more of LEDs 266-268 to provide the first light emissions of the first color. For example, processor 260 may control power to the one or more of LEDs 266-268 to provide the first light emissions of the first color.

At 540, third user input that is associated with a second possible selection associated with the element of the GUI may be received via the rotary encoder of the stylus. For example, rotary encoder 262 may receive third user input that selects "4 pixels", illustrated in FIG. 3E.

At 545, second information that indicates a second partial rotation of the rotary encoder may be provided to the information handling system in the wireless fashion. For example, stylus 210 may provide second information that indicates a second partial rotation of rotary encoder 262 to IHS 110 in the wireless fashion. For instance, stylus 210 may provide second information that indicates a second partial rotation of rotary encoder 262 to IHS 110 in the wireless fashion via communication device 280. In one or more embodiments, providing second information that indicates a second partial rotation of the rotary encoder to the information handling system in the wireless fashion may be performed in response to receiving, via the rotary encoder of the stylus, the third user input that is associated with the second possible selection associated with the element of the GUI.

At 550, the second information may be received. For example, IHS 110 may receive the second information in the wireless fashion. For instance, IHS 110 may receive the second information in the wireless fashion via communication device 190.

At 555, the element of the GUI may be adjusted to display the second possible selection associated with the element of the GUI. For example, IHS 110 may adjust the element of the GUI to display the second possible selection associated with the element of the GUI. For instance, IHS 110 may adjust icon 326 to "4 pixels". In one or more embodiments, adjusting the element of the GUI to display the second possible selection associated with the element of the GUI may be performed in response to receiving the second information.

At 560, second light emissions of a second color may be provided. For example, stylus 210 may provide second light emissions of a second color. For instance, one or more of LEDs 266-268 may provide second light emissions of a second color. In one or more embodiments, providing second light emissions of a second color may be performed in response to receiving, via the rotary encoder of the stylus, the third user input that is associated with the second possible selection associated with the element of the GUI. In one or more embodiments, processor 260 may control the one or more of LEDs 266-268 to provide the second light emissions of the second color. For example, processor may control power to the one or more of LEDs 266-268 to provide the second light emissions of the second color. In one or more embodiments, the second color may be different from the first color.

At 565, fourth user input may be received via an electromechanical switch of the stylus. For example, fourth user input may be received via switch 264. In one or more embodiments, a switch of stylus 210 may be actuated to confirm and/or to set the configuration setting. In one example, switch 264 (illustrated in FIGS. 2A and 2C) may be actuated to confirm and/or to set the configuration setting. In another example, switch 264A (illustrated in FIGS. 2D-2F) may be actuated to confirm and/or to set the configuration setting.

At 570, third information that indicates an actuation of the electromechanical switch may be provided to the information handling system in the wireless fashion. For example, stylus 210 may provide third information that indicates an actuation of switch 264 to IHS 110 in the wireless fashion. For instance, stylus 210 may provide third information that indicates an actuation of switch 264 to IHS 110 in the wireless fashion via communication device 280. In one or more embodiments, providing third information that indicates an actuation of the electromechanical switch to the information handling system in the wireless fashion may be performed in response to receiving the fourth user input via the electromechanical switch of the stylus. In one or more embodiments, providing third information that indicates an actuation of the electromechanical switch to the information handling system in the wireless fashion may include providing information that indicates the selection of the second possible selection associated with the element of the GUI to the information handling system in the wireless fashion.

At 575, the third information may be received. For example, IHS 110 may receive the third information in the wireless fashion. For instance, IHS 110 may receive the third information in the wireless fashion via communication device 190.

At 580, the second possible selection associated with the element of the GUI may be selected. For example, "4 pixels", illustrated in FIG. 3E, may be selected. In one or more embodiments, IHS 110 may select the second possible selection associated with the element of the GUI. In one or more embodiments, selecting the second possible selection associated with the element of the GUI may be performed in response to receiving the fourth user input via the electromechanical switch of the stylus.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A stylus communicatively coupled to an information handling system (IHS) having a display for presenting a graphical user interface (GUI), the stylus comprising:
   a processor;
   a rotary encoder coupled to the processor;
   an electromechanical switch coupled to the processor, the electromechanical switch comprising a slider configurable in one position of a plurality of positions;
   a set of light emitting diodes (LEDs) configurable to emit light having a color in a visible spectrum; and
   a memory medium, coupled to the at least one processor, that stores instructions executable by the processor, which when executed by the processor, cause the stylus to:
      receive, via the electromechanical switch, a first user input comprising an indication of the slider in a position of the plurality of positions;
      receive, via the rotary encoder, a second user input associated with an element of the GUI;
      in response to receiving the second user input, emit, via the set of LEDs, first light emissions of a first color in the visible spectrum;
      receive, via the rotary encoder, a third user input associated with a selection associated with the element of the GUI;
      in response to receiving, the third user input, emit, via the set of LEDs, second light emissions of a second color in the visible spectrum, different from the first color;
      and
      communicate, to the IHS, information that indicates the selection associated with the element of the GUI.

2. The stylus of claim 1, wherein:
the first position is associated with an operating mode of the portable information handling system;
the second position is associated with an operating mode of an application; and
the third position is associated with an operating mode of the stylus.

3. The stylus of claim 2, wherein:
the first user input comprises movement of the slider to the first position; and
the second user input is associated with one of a power setting, a volume setting and a performance setting of the information handling system.

4. The stylus of claim 2, wherein:
the first user input comprises movement of the slider to the second position; and
the second user input is associated with selection of one application of a plurality of applications installed on the information handling system.

5. The stylus of claim 4, wherein:
in response to receiving the second user input associated with a graphic application, the stylus is configured to perform one or more of: operate as one of a scroll wheel to switch between a plurality of windows, rotate a graphic, and select a timeline of a video.

6. The stylus of claim 2, wherein:
the first user input comprises movement of the slider to the third position;
the third user input comprises a configuration setting;
the set of LEDs is configured to provide the first light emissions via a knob coupled to the rotary encoder; and
the instructions cause the stylus to provide the first light emissions of the first color via the plurality of LEDs.

7. The stylus of claim 6, wherein:
the set of LEDs includes at least two of a red LED, a green LED, and a blue LED; and
the knob is translucent.

8. A method, comprising:
receiving, via a stylus, a first user input comprising an indication of a slider in a position of a plurality of positions
receiving, via a rotary encoder of the stylus, a second user input associated with a selection associated with an element of a graphical user interface (GUI);
in response to receiving the second user input, providing first light emissions of a first color in a visible spectrum;
receiving, via the rotary encoder, a third user input associated with a selection associated with the element of the GUI;
in response to receiving the third user input, providing second light emissions of a second color in the visible spectrum, different from the first color;
and
in response to receiving the third user input, selecting the second selection associated with the element of the GUI.

9. The method of claim 8, further comprising:
in response to the receiving the first user input indicating the slider is in a first position, displaying a set of GUI items associated with an operating mode of the information handling system;
in response to the receiving the first user input indicating the slider is in a second position, displaying a set of GUI items associated with an operating mode of an application; and
in response to the receiving the first user input indicating the slider is in a third position, displaying a set of GUI items associated with an operating mode of the stylus.

10. The method of claim 9, wherein:
in response to receiving the first user input indicating the slider is in the first position, displaying a set of selections associated with the operating mode of the information handling system, wherein the set of selections associated with the operating mode of the information handling system comprises a power setting, a volume setting and a performance setting of the information handling system;
in response to receiving, via the rotary encoder, the second user input indicating a selection of the set of selections the operating mode of the information handling system, displaying a selection slider for adjusting the operating mode of the information handling system.

11. The method of claim 10, wherein the third user input comprises an indication of one of a movement of a tip of the stylus on a surface displaying the GUI and a movement of a cursor on the display.

12. The method of claim 9, wherein:
in response to receiving the first user input indicating the slider is in the second position, displaying a plurality of icons, each icon associated with an application;
the rotary encoder is configured to scroll between the plurality of icons; and
the second user input comprises and indication of a selection of an application in the plurality of applications.

13. The method of claim 12, wherein:
the third user input comprises one of a rotation of the rotary encoder and a movement of a cursor to indicate adjustment of a setting of the application.

14. The method of claim 9, wherein:
in response to receiving the first user input indicating the slider is in the third position, displaying a set of selections associated with the operating mode of the stylus;
the rotary encoder is configured to scroll between a plurality of icons associated with a plurality of operating modes of the stylus; and
the second user input comprises and indication of a selection of an operating mode of the stylus.

15. The method of claim 14, wherein:
the third user input comprises one of a rotation of the rotary encoder, a force sensed on a surface of the device, and a movement of a cursor to indicate adjustment of a setting of the stylus; and
the method comprises the stylus emitting the first light emissions of the first color.

16. The method of claim 15, wherein the plurality of LEDs include at least two of a red light emitting diode (LED), a green LED, and a blue LED.

17. The method of claim 9, further comprising:
determining that the stylus is in contact with a display; and
activating a plurality of pixels associated with a location of contact with the display with the second color.

* * * * *